US010572778B1

(12) United States Patent
Robinson et al.

(10) Patent No.: US 10,572,778 B1
(45) Date of Patent: Feb. 25, 2020

(54) MACHINE-LEARNING-BASED SYSTEMS AND METHODS FOR QUALITY DETECTION OF DIGITAL INPUT

(71) Applicant: Prime Research Solutions LLC, Flushing, NY (US)

(72) Inventors: Jonathan Robinson, Flushing, NY (US); Leonid Litman, Bronx, NY (US); Miriam Kerstein, Brooklyn, NY (US)

(73) Assignee: Prime Research Solutions LLC, Flushing, NY (US)

( * ) Notice: Subject to any disclaimer, the term of this patent is extended or adjusted under 35 U.S.C. 154(b) by 0 days.

(21) Appl. No.: 16/354,437

(22) Filed: Mar. 15, 2019

(51) Int. Cl.
| | |
|---|---|
| *G06N 20/20* | (2019.01) |
| *G06K 9/62* | (2006.01) |
| *G06F 9/54* | (2006.01) |
| *H04L 29/08* | (2006.01) |
| *G06F 3/0482* | (2013.01) |

(52) U.S. Cl.
CPC ........... *G06K 9/628* (2013.01); *G06F 3/0482* (2013.01); *G06F 9/542* (2013.01); *G06N 20/20* (2019.01); *H04L 67/22* (2013.01)

(58) Field of Classification Search
None
See application file for complete search history.

(56) References Cited

U.S. PATENT DOCUMENTS

| | | | | |
|---|---|---|---|---|
| 5,944,530 A | * | 8/1999 | Ho .......................... | G09B 5/06 434/236 |
| 7,979,145 B1 | * | 7/2011 | Beck ....................... | G06Q 30/02 463/1 |
| 8,019,069 B1 | * | 9/2011 | Cyriac .................... | H04M 3/563 379/201.01 |
| 8,935,176 B2 | | 1/2015 | Willner et al. | |
| 9,460,350 B2 | | 10/2016 | Cook et al. | |
| 9,690,915 B2 | * | 6/2017 | Turgeman ........ | H04N 21/25866 725/14 |

(Continued)

FOREIGN PATENT DOCUMENTS

| | | | | |
|---|---|---|---|---|
| CA | 2557344 A1 | * | 2/2008 | ............. G06Q 10/00 |

OTHER PUBLICATIONS

Nanni, L. et al. (2006). "An experimental comparison of ensemble of classifiers for biometric data". Neurocomputing 69 (2006) 1670-1673. DOI:10.1016/j.neucom.2006.01.013 (Year: 2006).*

(Continued)

*Primary Examiner* — Kamran Afshar
*Assistant Examiner* — Benjamin J Buss
(74) *Attorney, Agent, or Firm* — Weiss & Arons LLP

(57) ABSTRACT

Systems and methods for assessing and maintaining the quality, validity, and/or accuracy of digital participant input are provided. Methods may include capturing session data via a computing device, building a set of metrics based on the session data, deriving a set of characteristic scores, generating a set of classifications based on the set of characteristic scores, and displaying the set of classifications on a user interface ("UP") that is associated with a session administrator. The set of classifications may include a flag for rejecting a session and/or a participant when the set of characteristic scores includes a score that is outside a predetermined threshold.

22 Claims, 7 Drawing Sheets

(56) References Cited

U.S. PATENT DOCUMENTS

| | | | |
|---|---|---|---|
| 2003/0078804 | A1* | 4/2003 | Morrel-Samuels ......................... G06Q 10/0639 705/7.42 |
| 2004/0093261 | A1* | 5/2004 | Jain ........................ G06Q 10/10 705/7.32 |
| 2006/0242138 | A1* | 10/2006 | Brill ....................... G06F 16/951 |
| 2008/0082931 | A1* | 4/2008 | Morrel-Samuels ......................... G06F 17/243 715/765 |
| 2008/0294637 | A1* | 11/2008 | Liu ........................ G06Q 30/02 |
| 2009/0024461 | A1* | 1/2009 | Willner .................... G06F 3/011 705/14.47 |
| 2010/0034366 | A1* | 2/2010 | Basson .................... G10L 15/22 379/202.01 |
| 2011/0145043 | A1 | 6/2011 | Handel |
| 2012/0254911 | A1* | 10/2012 | Doe ................. H04N 21/25866 725/14 |
| 2014/0047465 | A1 | 2/2014 | Zaslavsky et al. |
| 2014/0281945 | A1* | 9/2014 | Avni .................. G06K 9/00174 715/268 |
| 2014/0343921 | A1* | 11/2014 | Fink ........................ G06F 17/27 704/9 |
| 2016/0055844 | A1* | 2/2016 | Aronowitz .............. G01R 29/26 |
| 2016/0225272 | A1* | 8/2016 | Shea ....................... G06Q 20/10 |
| 2016/0350761 | A1* | 12/2016 | Raziel .................... G06Q 40/06 |
| 2017/0039571 | A1* | 2/2017 | Eisen ..................... G10L 15/22 379/202.01 |
| 2017/0161478 | A1* | 6/2017 | Stavrou .............. G06Q 30/0203 |
| 2017/0185935 | A1* | 6/2017 | Volkov ............. G06Q 10/06398 |
| 2017/0249389 | A1* | 8/2017 | Brovinsky ............. G06Q 30/02 |
| 2017/0293878 | A1* | 10/2017 | Donnelly ....... G06Q 10/063112 |
| 2018/0089412 | A1* | 3/2018 | Kopikare .............. G06Q 30/02 |
| 2018/0103047 | A1* | 4/2018 | Turgeman .............. G01R 29/26 |
| 2018/0114270 | A1* | 4/2018 | Addy .................... G06Q 40/06 |
| 2018/0232752 | A1* | 8/2018 | BaderEddin ....... G06Q 30/0203 |
| 2019/0019204 | A1* | 1/2019 | Kopikare ........... G06Q 30/0203 |
| 2019/0044942 | A1* | 2/2019 | Gordon .............. H04L 63/0861 |

OTHER PUBLICATIONS

Shimson, T. et al. (2010). "Continuous Verification Using Keystroke Dynamics". 2010 International Conference on Computational Intelligence and Security. IEEE. pp. 411-415. (Year: 2010).*

De Sio, L. (2010). "Beyond 'position' and 'valence': A unified framework for the analysis of political issues." (2010). (Year: 2010).*

Zhang, B. (2013). "Reliable Classification of Vehicle Types Based on Cascade Classifier Ensembles". IEEE Transactions on Intelligent Transportation Systems, vol. 14, No. 1, March 2013. pp. 322-332. (Year: 2013).*

Pavlick, E. et al. (2014). "The Language Demographics of Amazon Mechanical Turk". Transactions of the Association for Computational Linguistics, 2 (Published Feb. 2014) 79-92. Action Editor: Mirella Lapata. (Year: 2014).*

Cooley, B. (2016). "Determining Unique Agents by Evaluating Web Form Interaction." Thesis. Gerogia Southern University. (Year: 2016).*

Buchanan, E.M. et al. (Mar. 2018). "Methods to detect low quality data and its implication for psychological research". Behavior Research Methods. Published online: Mar. 14, 2018. Springer. DOI:10.3758/s13428-018-1035-6 (Year: 2018).*

Cepeda, C. et al. (Aug. 2018). "Mouse Tracking Measures and Movement Patterns with Application for Online Surveys." In International Cross-Domain Conference for Machine Learning and Knowledge Extraction, (Year: 2018).*

"Biocatch: The Leader in Behavioral Biometrics," https://www.biocatch.com/, Retrieved on Mar. 14, 2019.

Jon Freeman, "Mousetracker," http://www.mousetracker.org/, Retrieved on Mar. 14, 2019.

"Splunk and Tensorflow for Security: Catching the Fraudster with Behavior Biometrics," https://www.splunk.com/blog/2017/04/18/deep-learning-with-splunk-and-tensorflow-for-security-catching-the-fraudster-in-neural-networks-with-behavioral-biometrics.html, Splunk Inc., Retrieved on Mar. 14, 2019.

"Study Island: 30 Minutes a Week to Growth," https://www.studyisland.com/, Retrieved on Mar. 18, 2019.

* cited by examiner

MACHINE-LEARNING-BASED SYSTEMS AND METHODS FOR QUALITY DETECTION OF DIGITAL INPUT

FIELD OF TECHNOLOGY

Aspects of the disclosure relate to data processing. Specifically, aspects of the disclosure relate to computer-based methods and systems for assessing and maintaining quality of digital input.

BACKGROUND OF THE DISCLOSURE

When scientific studies require the use of human participants, the researchers performing the studies must be able to obtain participants. In the Internet age, the search for such participants has become simpler. As online research grows more ubiquitous, scientists of all segments are relying on crowdsourcing platforms to access study participants. The study itself is often conducted online as well. However, many researchers express concerns about the validity of studies conducted online. The concerns stem from the inability to adequately vet and monitor the participants remotely under the standard methods of conducting online studies.

In a brick and mortar laboratory, a researcher can verify the demographic profile (e.g., gender, age bracket, etc.) of participants and actively monitor participants to ensure that they remain focused, engaged, and on task during the entirety of their performance in the study. In online data collection, on the other hand, participants may make false claims about their identity and may be multitasking, minimally focused on the task, or altogether inattentive to the study they are taking. This may result in inaccurate and/or invalid results, which can be detrimental to the quality of the study.

Furthermore, it is important in many online arenas to ascertain certain qualities about participants. For example, a blog or forum that tailors to a certain group, e.g., a specific gender or racial/ethnic group, may be compromised if a fraudulent participant masquerades as someone from the group. The ability to monitor participant input and verify qualities, such as demographic characteristics, may help maintain the safety and integrity of the online forum.

For at least these reasons, it would be desirable to provide systems and methods for monitoring digital input. It would be further desirable for the systems and methods to assess and maintain the validity, accuracy and/or quality of the input.

SUMMARY OF THE DISCLOSURE

Aspects of the disclosure relate to a system for assessing one or more characteristics of digital participant input. The system may include computer executable code that is run on a processor. The system may be configured to receive a set of session data. The session data may include participant activity data captured on a computing device. The activity data may be generated by a participant during a session on the computing device.

The system may build a set of metrics based on the session data. The system may derive a set of characteristic scores by feeding the set of metrics to one or more machine learning ("ML") ensembles. The system may generate a set of classifications based on the set of characteristic scores. The system may display the set of classifications on a user interface ("UI") that is associated with a session administrator. The set of classifications may include a flag for rejecting the session and/or the participant when the set of characteristic scores includes a score that exceeds, or is otherwise different from, a predetermined or dynamically computed threshold.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
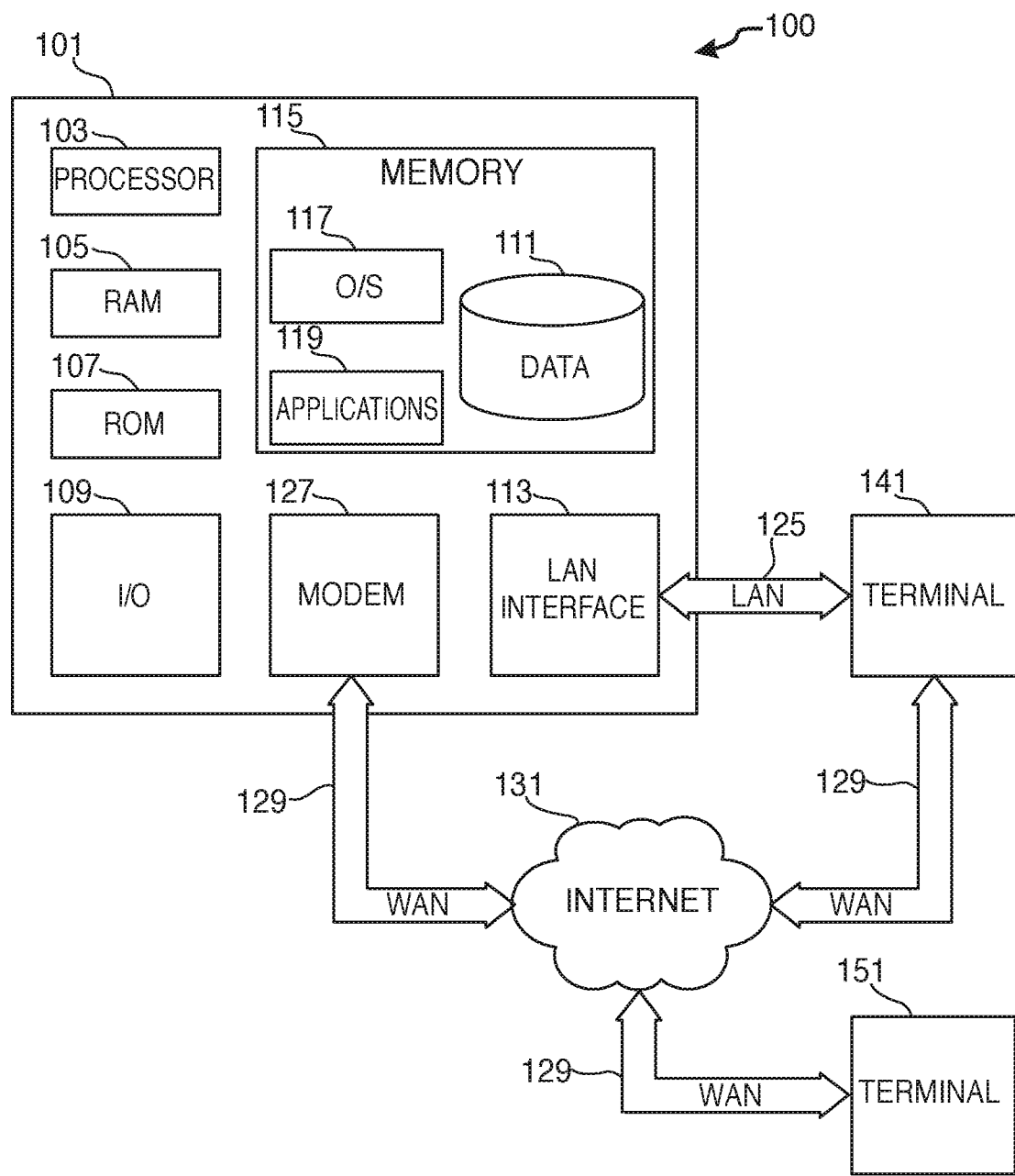
FIG. 1 shows an illustrative system in accordance with principles of the disclosure.

A method for assessing one or more characteristics of digital participant input is provided. The method may be executed by computer code stored in non-transitory memory and running on a processor. The participant input may be generated by a participant during a session on a computing device. A session may be any suitable interval of computer activity. For example, the session may include the participant responding to an online survey.

The method may include capturing session data via the computing device. The session data may include participant activity data. In certain embodiments, participant activity data may include mouse movements. Mouse movements may include a mouse position at each timepoint, and events such as key-down, key-up, entrances, exits, copies, pastes, selections, mouse-ups, mouse-downs, resizes, and loss of focus, along with their metadata. A loss of focus event may include a scenario when the participant's cursor is no longer focused on a target. This may be a target element (i.e. a form field), or the general target window. Session data may also include any other suitable event that is triggered on the computing device of the participant.

Participant activity data may also include keystrokes. Keystrokes may include identification of which key was pressed along with associated metadata. Metadata may include a timestamp, and any other suitable information about the activity data. Participant activity data may also include touchscreen activity, trackpad activity, or any other suitable participant activity.

The session data may also include language-based or text-based session content. The session content may include a textual input or a response of the participant. The response may be responsive to a question, e.g., a survey question. The session content may also include the survey question, or other language content that the participant may be responding to, or any other suitable session content.

The session content may, in some embodiments, be reconstructed from keystroke data. The session content may be captured directly from the form fields, such as answer and/or question fields, of the page of the session itself. The session content may also be captured from files (e.g., CSV files) that may be retrievable after a survey or other session.

The method may, in certain embodiments, include receiving a configuration selection from a session administrator for determining which session data to capture. The session administrator may be someone with administrative authority over the session. In the case of a survey, the administrator may be a researcher. The selection may be received via a user interface ("UP") that is associated with the session administrator.

In one example, an administrator may be presented with an option to exclude the capture of some or all session content. The options may enable the administrator to exclude only the response content, and allow survey question content. The options may enable the administrator to exclude direct capturing of content, but allow reconstructing of content from keystrokes. The options may enable the administrator to exclude even keystrokes. The options may enable the administrator to exclude the capture of any suitable portion of the session data. In yet another embodiment, the administrator may be presented with options to adjust the data persistence. For example, an option may enable the administrator to select a configuration to erase the actual session data after it is processed.

Some embodiments of the method may include streaming the session data as a data stream to a database. The database may be any suitable database, including, in some embodiments, a cloud-based database. The data stream may be monitored for one or more predetermined events. Certain preferred embodiments may perform the monitoring in real-time. One example of a predetermined event may include pasting content. Another example may include an idle time that is more than a predetermined threshold duration. Yet another example may include a loss of focus event. Still another example many include leaving or exiting a webpage window of the survey.

When an event from the one or more predetermined events is detected, the method may include triggering a predetermined reaction. Examples of predetermined reactions may include flagging the session, aborting the session, and/or transmitting an alert to the participant via the computing device and/or to the administrator via the UI.

The method may include building a set of metrics based on the session data. The set of metrics may include raw data captured during the session. The set of metrics may also include metadata and/or feature sets derived or calculated from the raw data. For example, the set of metrics may include mouse cursor positions, as well as various quantities derived from the mouse cursor positions. The quantities may, by design, be usable to derive informative about participant characteristics and behaviors.

In certain embodiments, the set of metrics may include absolute metrics and relative metrics. Building the set of metrics may include generating the absolute metrics based on the session data, and generating the relative metrics by comparing the absolute metrics of the participant to absolute metrics of other participants.

In some embodiments of the method, building the set of metrics may include performing behaviometric (i.e., relating to measurements of certain behaviors) analysis and/or natural language processing ("NLP"—i.e., digital processing of language content) analysis on the session data.

In an example of an online survey, the participant input is often in response to one or more questions presented on one or more pages displayed on the computing device during the session. In these and other scenarios, the session data may include page data of each page in addition to the participant activity data. Capturing the session data may include scraping a layout of each page to obtain the page data. Scraping the page layout may include parsing the document object model ("DOM") of the survey and recording positioning and content of question and answer fields, as well as the browser type and resolution, as part of the page data. Capturing session data may include obtaining session content, such as text of participant input and/or session questions or prompts. Obtaining session content may also include lifting, scraping, or otherwise obtaining the content from the DOM. Capturing the session data may also include logging cursor movements, keystrokes, and other input events on the computing device to obtain the participant activity data.

In some embodiments, building the set of metrics may include calculating spatial metrics based on trajectories of the cursor movements and the page data. Many of these metrics may be derived geometrically. By treating the DOM as a coordinate plane, the method may include calculating ideal trajectories from click to click, and computing deviations from those ideal trajectories. The spatial metrics may include an absolute deviation from an ideal trajectory of the cursor movement. The spatial metrics may also include a maximum deviation from the ideal trajectory of the cursor movement.

Building the set of metrics may also include calculating temporal metrics based on time measurements of participant interaction with a page. For example, this may include calculating the time that the cursor spends in a target location of a page. The target location may be defined for each page based on the page data. For example, the target location may be determined based on a positioning of question and answer fields in the DOM.

Calculating temporal metrics may include summing the time that the cursor spends in the target location of each page for a total time in target. Calculating temporal metrics may also include calculating a ratio of the total time in a target location versus the total duration of the session.

Calculating temporal metrics may include deriving an engagement ratio. The engagement ratio may be derived by calculating the percentage of time that the participant interacts with a page relative to the total time that the page is displayed.

Temporal metrics may include a reading time. A reading time may be based on the amount of time a participant spends on a question. Calculating a reading time may include normalizing the amount of time spent on a question by the question length.

Temporal metrics may include a pause time. A pause time may be the amount of time that the cursor is idle in the middle of a trajectory.

Calculating temporal metrics may include calculating a total time that the cursor is not present in the session window. Calculating temporal metrics may further include calculating a ratio of the total time that the cursor is not present in the session window versus the total duration of the session.

Building the set of metrics may also include calculating keystroke metrics. The keystroke metrics may be based on flight time, dwell time, and/or pause time of the keystrokes.

Calculating keystroke metrics may, for example, include calculating a flight time for each keystroke, calculating an average flight time across all keystrokes in the session, calculating a dwell time for keystrokes of character bigraphs, calculating an average dwell time across all keystrokes in the session, and/or calculating mid-typing pause time.

Building the set of metrics may also include calculating total counts for certain events. Exemplary events may include loss-of-focus events, exit events, entrance events, and extraneous click events.

In certain embodiments of the method, building the set of metrics may include performing natural language processing ("NLP") on the session data. For example, NLP may be performed when the participant input is an open-ended input. An open-ended input may include textual input, or any suitable input that is not in response to a closed-ended prompt (a closed-ended prompt may include multiple choice or true/false options). In this scenario, building the session data may include capturing session content, logging keystroke data, touchscreen tap data, or other content-based data on the computing device to obtain the participant activity data.

In some embodiments, capturing session content, performing NLP, and/or logging keystroke data may be subject to user selection, or may be system-set. For example, a session administrator may be presented with selectable options to configure a survey prior to administering the survey. The administrator may be able to select whether to collect keystroke data, and/or whether to perform NLP analysis on the keystroke data.

Building the set of metrics based on NLP analysis of session data may, in certain embodiments, include calculating a lexical quality of the participant input. This may include calculating a word count, sentence count, and/or average word per sentence count of the participant input. Calculating the lexical quality of the participant input may, in some embodiments, include calculating a verb ratio and/or noun ratio of the participant input. The calculating may employ a parts-of-speech tagging tool (e.g., from the "NLTK" distribution). Calculating a lexical quality of the participant input may also include calculating, via an NLP tool, a lexical grade level of the participant input.

NLP analysis may also include calculating, via a word similarity tool (e.g., Google's "word-to-vec"), a relevance of the participant input. Relevance may include coverage and overlap to a question to which the participant input is responsive. Coverage may be defined as a ratio of words in the question that have a similar word in the participant input. Conversely, overlap may be defined as a ratio of words in the participant input that have a similar word in the question.

NLP analysis may also include calculating the relevance of the participant input to a common corpus. The common corpus may be a body of data (e.g., a word corpus) built from inputs of other participants to the question.

In some embodiments, NLP may be used to derive a consistency score based on historical data. The historical data may include previous answers this participant gave to other questions, e.g., from other surveys. NLP may be used to characterize the historical questions and answers. When a current question is characterized as within a threshold similarity to one or more of the previous questions, and/or the current given answer is outside a threshold similarity to the previous answers, a probability of inconsistency may be computed. The computation may include suitably trained ML tools. For example, if a participant previously answered that he or she is depressed, and then the participant answers that he or she is exuberant and exercises every morning, the inconsistency score may be computed to be high. If a participant's responses are highly improbable, that participant may be flagged as inconsistent.

In some embodiments, the historical data may also include answers of other participants. In this scenario, the computation may include forming correlated sets of questions and answers and comparing the participant's sets to the sets of others. For example, if most people who gave answer X' to question X gave answer Y' to question Y, and the current participant gave answer X' to question X but a different answer (not Y') to question Y, the system may compute a probability of inconsistency. Suitable ML tools may be used in the computation. NLP tools may also be used to create content equivalent groups of questions and answers, so that, for example, question X may include a group of equivalent questions, and answer X' may include a group of equivalent answers, etc. In still other embodiments, social media, news, the internet, or other suitable digital sources of information may be leveraged to create correlated sets of questions and answers.

The method may include deriving a set of characteristic scores based on the set of metrics. The deriving may include feeding the set of metrics to one or more machine learning ("ML") ensembles (alternatively referred to as "models" or "classifiers"). A score may include a number that represents a probability, e.g., a number between 0 and 1.

The ML classifiers, may be trained using various datasets. The training may, in certain embodiments, be part of the disclosed systems and methods. In one example, the training may include building a model of engagement and attentiveness. This may involve administering a number of surveys with embedded, trusted attention checks and consistency scores. Behaviometric and/or NLP data may be collected from those surveys, and the attention score embedded in the survey may be used as the classification. Several surveys may also be administered in a brick and mortar lab, while optionally controlled for certain conditions (such as presence of significant distractions, etc.) The behaviometric data may be collected from these controlled surveys and the known, manipulated condition may be used as a classification. The machine learning ensemble classifiers may be trained on these datasets, thereby providing a model for engagement and focus in online surveys.

In addition to training classifier models on whole datasets from complete surveys, some embodiments also include training models to predict a data quality score based on segments of a survey. This may be done by breaking each event stream into segments, and training the model on those segments. Each segment may, in some embodiments, also include the data of the previous segments. In this way, as a participant progresses through the survey, the system can gauge the participant's real time attentiveness and engagement.

When the system detects a participant's flagging attention, multi-tasking, copy pasting, rushing, inconsistency, etc., the participant may be notified that his lack of attention is being monitored, and he is encouraged to refocus on the task. This recreates the surveillance of brick and mortar labs in the online data collection experience. Furthermore, real time intelligence may be provided to the administrator (alternatively referred to as a "researcher," or as a "user" of the system) on the dashboard, as well. (For example: "Participant xxxxx-in progress-current attentiveness poor-worker alerted to stay on task.")

The set of characteristic scores may, in certain embodiments, include data quality scores. Exemplary data quality scores may include an attentiveness score, an accuracy score, a validity score, a consistency score, and/or a reading score.

In some embodiments, deriving a reading score may include using behaviometrics to classify a participant's behavior—e.g., near a passage of text—to determine the likelihood that the participant was actually reading the passage. In some embodiments, it may be an independent object of a system to derive a reading score.

The set of characteristic scores may include participant demographic scores. Exemplary participant demographic scores may include an age-bracket score, a gender score, and/or a nationality score. A nationality score may, in some embodiments, include a probability of the participant being a native speaker of the language of the task (e.g., English) or not. In some embodiments, a demographic score may also be usable to contribute to a data quality score, e.g., if the demographic score indicates a demographic that is different than that which the participant claims.

In some embodiments of the method, building the set of metrics and deriving the set of characteristic scores may be executed after completing the session and/or at predetermined time intervals (or, alternatively, substantially continuously) throughout the session.

When characteristic scores are derived at intervals during a session, the method may include transmitting alerts. For example, when a characteristic score derived at an interval is outside a predetermined threshold, an alert may be transmitted to the participant via the computing device and/or to the administrator via the UI. In some embodiments, transmitting an alert to the participant may include displaying a message on a display of the computing device. The message may include a warning to the participant to be more attentive and/or more accurate in responding to the survey. In certain embodiments, when a characteristic score derived at an interval is outside a predetermined or dynamically computed threshold, the method may include flagging the session and/or aborting the session.

In some embodiments of the method, deriving the set of characteristic scores may include a multi-tiered ML classification process. In the multi-tiered process, the final set of characteristic scores may be a set of characteristic scores derived from one or more layers of preliminary sets of characteristic scores, each tier of scores derived via a set of ML classifiers based on the previous set of scores or metrics. For example, a two-tier process may include feeding the set of metrics to a first set of ML ensembles to derive a first, preliminary, set of characteristic scores, and feeding the preliminary set of characteristic scores to a second set of ML ensembles to derive the second, final, set of characteristic scores. The process may, in certain embodiments, be extended to include any suitable number of tiers.

An exemplary multi-tiered ML classification process may include a first set of ML classifiers that may generate specific scores, such as a reading score, multi-tasking score, engagement score, interest score, honesty score, attentiveness score, accuracy score, validity score, relevancy score, consistency score, and/or any other suitable characteristic score. A second-tier ML classifier may aggregate the specific scores from the first tier and generate a more general score, such as a data quality score. Training the second-tier classifier may include determining the correct weighting of the specific scores in generating the general score, and creating appropriate mappings between the multiple specific scores and the general scores for the training datasets. The multi-tiered ML classification process may be extendable to include any suitable number of successive sets of ML ensembles for deriving the final set of characteristic scores from the set of metrics.

In certain embodiments, the method may include generating a visual representation of at least a part of the session data. The visual representation may be configured to represent the session data in a visual, graphic way, e.g., as a graph or as an image. The image may resemble a map with, for example, lines that track cursor paths and/or other symbols that mark locations of other events, such as clicks. The visual representations may also be associated with metadata, such as timestamps, regarding the represented events. In these embodiments, the method may employ image classification techniques to generate at least a part of the set of characteristic scores from the visual representation.

In some embodiments, session data may include video data captured via a video recorder, e.g., a webcam associated with the computing device. Video data may include movements of the participant, such as head and eye movements. The video data may also be used to build metrics and generate characteristic scores, for example, an attentiveness score.

The method may include generating a set of classifications based on the set of characteristic scores. The method may also include displaying the set of classifications on the UI of the session administrator.

Displaying the set of classifications may include presenting a flag. The flag may be for rejecting the session and/or the participant. The flag may be presented when the set of characteristic scores includes a score that is outside a predetermined threshold.

In certain embodiments, presenting the flag may include presenting the session administrator, via the UI, with one or more selectable options. One example of a selectable option may include an option to automatically adjust a weighting of the participant input based at least in part on the set of characteristic scores. Another example may include excluding the participant input from a dataset generated by the survey. Yet another example may include rejecting the participant from some or all future surveys.

A system for maintaining a level of accuracy in an online survey is provided. The term "accuracy" may be used herein to refer to data accuracy, data validity, and/or data quality in general. The system may include computer executable code that is run on a processor. The system may be configured to receive session data. The session data may be received as a data stream. The session data may include activity data captured during a session on a computing device. The activity data may be generated by a respondent in response to the survey.

The system may be configured to build a set of metrics based on the session data, derive a set of characteristic scores based on the set of metrics, generate a set of classifications based on the set of characteristic scores, and display the set of classifications on a user interface ("UP") that is associated with a survey administrator.

The system may be further configured to monitor the data stream in real-time for one or more predetermined events. When a predetermined event is detected, the system may be configured to trigger a predetermined reaction. Exemplary reactions may include flagging the survey, aborting the session, and/or transmitting an alert. An alert may be transmitted to the respondent via the computing device. An alert may be transmitted to a survey administrator via a user interface ("UI").

In some embodiments, the system may be further configured to analyze session data at predetermined intervals throughout the session. At each interval, the system may build a separate set of metrics and derive a separate set of characteristic scores based on the session data accumulated at the interval. The session data accumulated may include only the session data of the interval itself, or, preferably, it may include all the session data aggregated from the session start through the current interval. The system may also, in certain embodiments, generate a separate set of classifications at each interval. When a characteristic score derived for a segment is outside a predetermined threshold, the system may be configured to transmit an alert to the respondent via the computing device and/or to the administrator via the UI.

In certain embodiments of the system, the set of metrics may include absolute metrics and relative metrics. The system may be configured to generate the absolute metrics based on the session data. The system may be further configured to generate the relative metrics by comparing the absolute metrics of the respondent to absolute metrics of other respondents.

The system may, in some embodiments, be configured to log mouse movements, keystrokes, and/or other suitable input events on the computing device during the session to capture the activity data of the session data. The system may also be configured to capture session content as part of the session data.

In certain embodiments, the system may be configured to perform behaviometric analysis on the session data to build a first subset of the set of metrics. The system may, additionally or alternatively, be configured to perform natural language processing ("NLP") analysis on the session data to build a second subset of the set of metrics. The set of characteristic scores derived based on the set of metrics may include values that assess a quality of the session data and/or values that assess demographic characteristics of the respondent.

In some exemplary embodiments, the first subset of metrics may be used to derive a first subset of characteristic scores, e.g., via a first set of machine-learning ("ML") classifiers. The first subset of characteristic scores may include values that assess a quality of the session data. The first subset of characteristic scores may, in some embodiments, include values that assess a personal quality (e.g., a demographic) of the respondent (e.g., an unsteady mouse cursor trajectory may indicate a high probability of an advanced age group). In some embodiments, the first subset of characteristic scores may be derived for all types of responses. In other embodiments, the first set of characteristic scores may be derived for session data generated in response to a closed-ended survey question.

The second subset of metrics may, in some exemplary embodiments, be used to derive a second subset of characteristic scores, e.g., via a second set of ML classifiers. The second subset of characteristic scores may include values that assess personal characteristics (e.g., demographics) of the respondent. The second subset of characteristic scores may, in some embodiments, include values that assess a quality of the session data. In some embodiments, the second subset of characteristic scores may be derived for session data generated in response to a survey question that is open-ended. In certain embodiments, the system may be configured to present the administrator with selectable options for choosing which session data is captured and/or which analysis is performed on the session data.

The first and second subsets of characteristic scores may fully or partially overlap. The first and second sets of ML classifiers may also fully or partially overlap. In some embodiments, behaviometric analysis and NLP analysis may be performed, either individually or in parallel, to obtain separate characteristic scores. In other embodiments, behaviometric and NLP analyses may overlap, and may be performed in coordination to obtain one or more of the same scores or score types.

For example, one embodiment may use behaviometric analysis to obtain certain data quality scores and NLP analysis to obtain certain demographic scores, or vice-versa. Other embodiments may, for example, use behaviometric analysis to obtain some data quality scores, and NLP analysis to obtain other data quality scores—and/or behaviometric analysis to obtain some demographic scores, and NLP analysis to obtain other demographic scores. Still other embodiments may use behaviometric and NLP analyses to separately obtain the same score type, and combine the two results for a final score. Yet other embodiments may include an ML classifier that takes both behaviometric and NLP derived metrics as input to generate a characteristic score output. Certain embodiments that use multi-tiered ML classification may, for example, use behaviometric analysis to obtain certain scores and NLP analysis to obtain other scores, and use a second layer of ML classifiers to obtain combined scores.

A platform for assessing one or more characteristics of digital participant input is provided. The platform may include computer executable code that is run on a processor. The platform may be configured to receive a set of session data. The session data may include participant activity data captured on a computing device. The activity data may be generated by a participant during a session. The participant may, in some embodiments, be responding to a survey, or typing posts to a blog or internet forum.

The platform may be configured to build a set of metrics based on the session data, and derive a set of characteristic scores based on the set of metrics. The platform may derive the characteristic scores by feeding the set of metrics to one or more machine learning ("ML") ensembles. The platform may be configured to generate a set of classifications based on the set of characteristic scores. The platform may also be configured to display the set of classifications on a user interface ("UI") that is associated with a session administrator. The set of classifications may include a flag for rejecting the session. The flag may be included when the set of characteristic scores includes a score that is outside a predetermined threshold.

In certain embodiments of the platform, the set of metrics may include absolute metrics and relative metrics. To build the set of metrics, the platform may be configured to generate the absolute metrics based on the session data, and generate the relative metrics by comparing the absolute metrics of the participant to absolute metrics of other participants.

In some embodiments, the platform may be configured to receive the session data as a data stream, and monitor the data stream in real-time for one or more predetermined events. When a predetermined event is detected, the platform may be configured to trigger a predetermined reaction.

In some embodiments, the platform may be further configured to analyze session data at predetermined intervals throughout the session. At each interval, the platform may be configured to build a separate set of metrics and derive a separate set of characteristic scores based on the session data accumulated at the interval. The session data accumulated may include only the session data of the interval itself, or, preferably, it may include all the session data aggregated from the session start through the current interval. When a characteristic score derived for a segment is outside a predetermined threshold, the platform may be configured to transmit an alert to the participant via the computing device and/or to the administrator via the UI.

In certain embodiments, the platform may be configured to perform behaviometric analysis on the session data to build a first subset of the set of metrics. The platform may, additionally or alternatively, be configured to perform natural language processing ("NLP") analysis on the session data to build a second subset of the set of metrics. The set of characteristic scores derived based on the set of metrics may include values that assess a quality of the session data and/or values that assess demographic characteristics of the participant.

Thus, systems and methods are provided that may monitor participants in real time and assess their engagement and attentiveness, and the overall quality of their digital input. The systems and methods may deliver this intelligence to administrators. The systems and methods may also facilitate participant engagement by interacting with participants when their inattention and/or lack of accuracy is detected and alerting them to remain on task.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions may be embodied in hardware or firmware (not shown). The computer 101 may execute the instructions embodied by the software to perform various functions.

Input/output ("I/O") module may include connectivity to a microphone, keyboard, touch screen, mouse, camera, and/or stylus through which a user of computer 101 may provide input. The input may include input relating to cursor movement. The input may be participant input. The participant input may be responsive to a survey, another suitable prompt, or, in some embodiments, self-initiated input. The input may also include input by an administrator via a UI. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, cloud-based memory, or any other suitable memory. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to assessing and/or maintaining the quality, validity, and/or accuracy of participant input.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
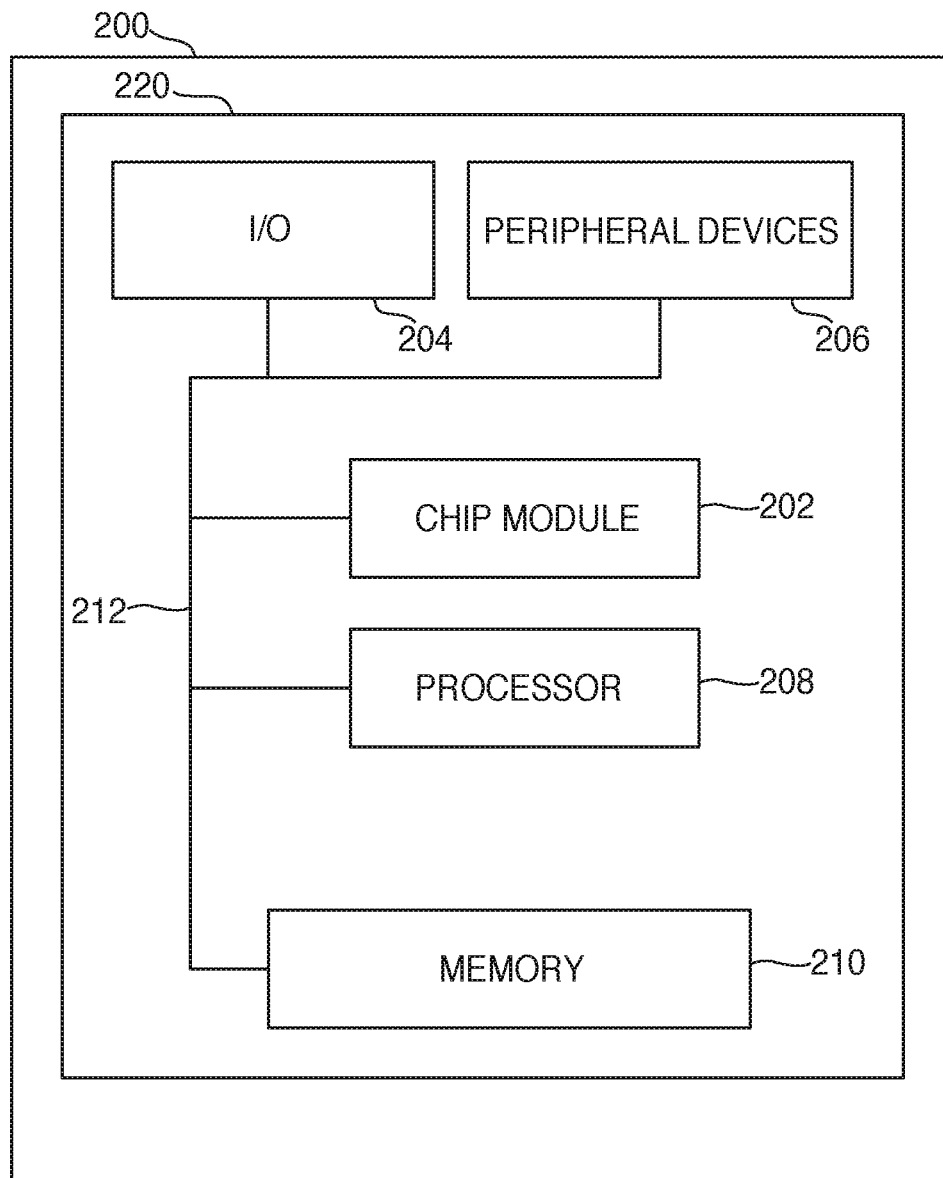
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
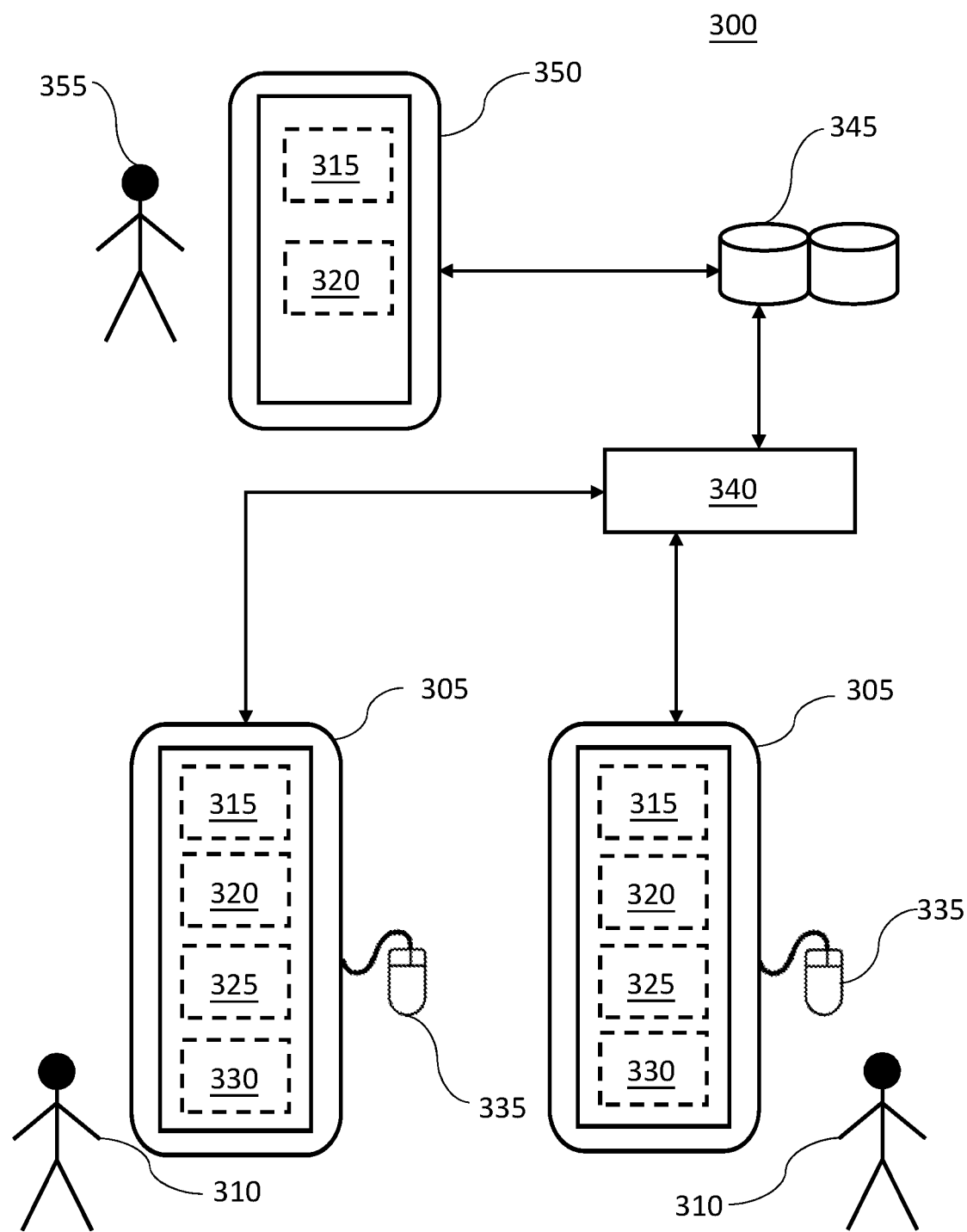
FIG. 3 shows an illustrative system in accordance with principles of the disclosure.

FIG. 3 shows illustrative system 300 in accordance with principals of the disclosure. System 300 may be for measuring the attentiveness, accuracy, validity, and/or quality of digital participant input.

According to an embodiment, system 300 may include one or more computing devices 305 being operated by one or more participants 310. According to an embodiment, each of the one or more computing devices 305 may include a processor 315, a memory 320, and a graphical user interface 325 which may include a display 330. According to an embodiment, the one or more computing devices 305 may further include a computer mouse 335 coupled thereto.

According to an embodiment, the system 300 may be configured such that the one or more computing devices 305 are configured to enable the one or more participants 310 to complete one or more tasks (e.g., surveys, quizzes, psychological queries, etc.), enabling the participants 310 to be respondents. According to an embodiment, data is collected from the one or more computing devices 305 and analyzed by one or more remote servers 340. The one or more remote servers 340 may be coupled to the one or more computing devices via a wired and/or wireless connection. According to an embodiment, the server is coupled to one or more memory storage sites 345 configured to store some or all of the information collected by, or generated by, the one or more remote servers 340.

According to an embodiment, once the one or more remote servers 340 collect the data from the one or more computing devices 305, the data is analyzed by the one or more remote servers 340. According to an embodiment, the collected data and/or the analysis of the collected data may be sent to one or more second electronic devices 350 to enable one or more administrators 355 to view the data. Administrator 355 may then be able to reject a participant and/or the data generated by a participant.

Figure 4:
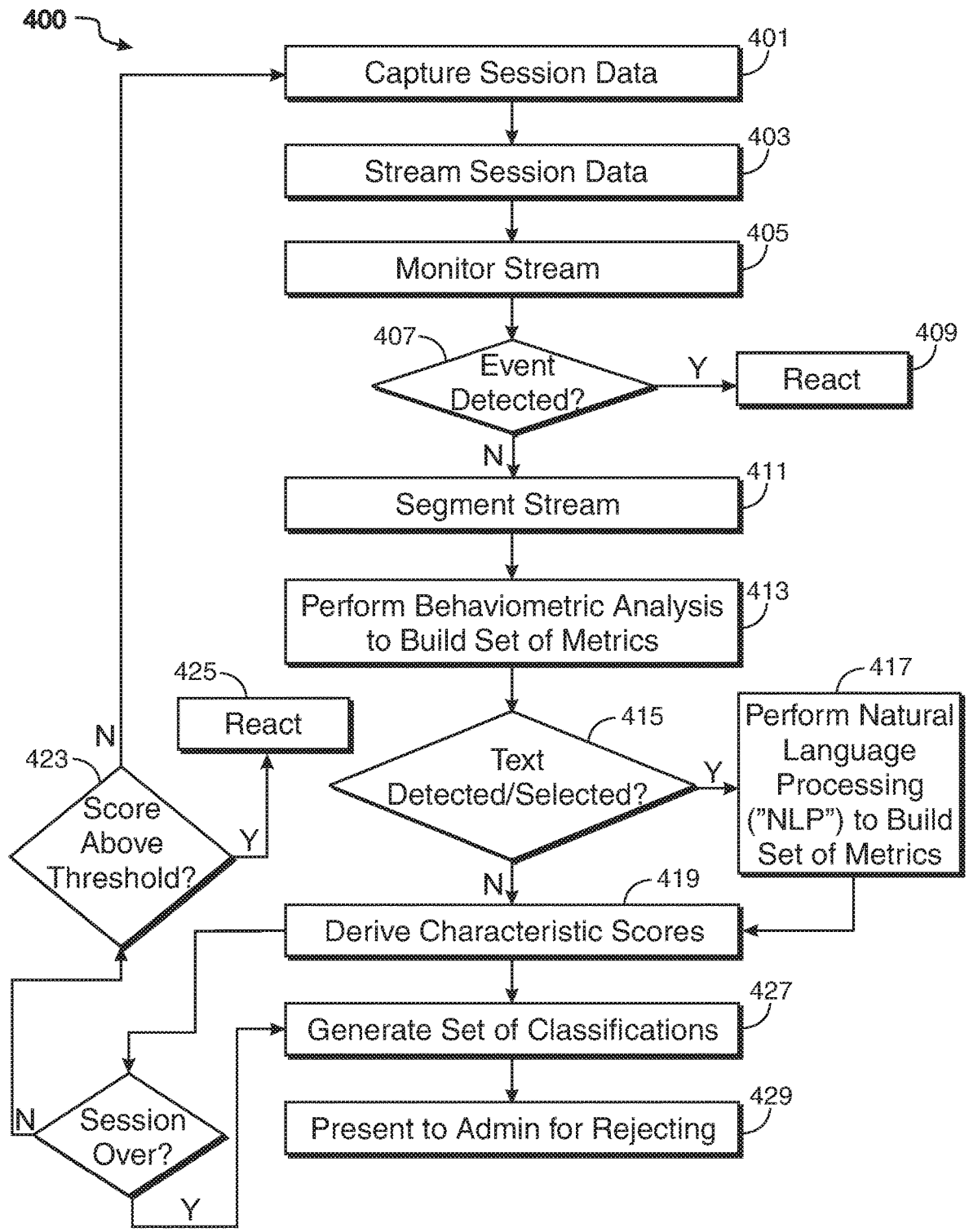
FIG. 4 shows an illustrative flowchart in accordance with principles of the disclosure.

FIG. 4 shows illustrative flowchart 400 according to principals of the disclosure. Flowchart 400 shows a logic flow of one illustrative embodiment. Other embodiments may include different steps and/or sequences of steps. The embodiment of shown in flowchart 400 may show a process run by a system for assessing and maintaining quality of participant input.

At step 401, the system may capture session data. At step 403, the system may stream the session data. For example, in an illustrative embodiment where the session includes a survey, capturing session data may include capturing session content, and logging mouse movements and keystrokes of a survey participant on a computing device via JavaScript. The session data may be streamed to a database in real time in the form of JSON. (Streaming the data to the database may include intermediate steps via the backend, such as processing the data using various tools and data processors, e.g., Amazon Web Services Kinesis and Lambda functions). The streamer may also parse the document object model ("DOM") of the survey and record positioning and content of question and answer fields, as well as the browser type and resolution, as part of the session data. The event streaming JavaScript can be embedded in the html of any online survey, thus making the system transferable to any survey platform. The streamer may also be configurable so that administrators, e.g., researchers, can customize events or data that they want captured, e.g., in order to meet review board requirements. In these embodiments, a configuration step may be included in the logic flow. The configuration step may, for example, precede step 401.

Table 1 below shows a sample JSON representing input events from a survey participant.

TABLE 1

{"dateTimeUtc": "2019-02-11T02:37:12.743Z", "type": "mousemove", "timeStamp": 373801.19999998715, "x": 624, "y": 730}
{"dateTimeUtc": "2019-02-11T02:34:26.249Z", "type": "onkeydown", "timeStamp": 207306.10000004526, key: 'f'}
{"dateTimeUtc": "2019-02-11T02:37:16.307Z", "type": "onpaste", "timeStamp": 377365.8999999752, clipboard: 'pasted text'}

At step 405 of flowchart 400, the system may monitor the stream of session data. If a predetermined event is detected at step 407, the system may execute a predetermined reaction at step 409. Exemplary reactions may include sending an alert (e.g., alert 501 shown in screenshot 500 of FIG. 5 below) or aborting the session. If the reaction includes an abort, the process may effectively end at step 409. If the reaction includes an alert, or if no event was detected at step 407, the system may proceed to step 411.

At step 411, the data stream may be segmented based on predetermined intervals of the session. Intervals may include 1, 3, 5, 20, 30, or 45 seconds. Intervals may be 1 or a few minutes, or any other suitable time interval. Segmenting the data stream may include an actual segmentation of the data or a virtual segmentation. Segmenting the data stream may also include running, at each interval, an analysis on all the session data aggregated so far from the session. In this preferred embodiment, the analysis (i.e., building set of metrics and deriving characteristic scores) run at each successive interval may encompass an increasingly larger pool of data than that of the previous interval.

Step 413 includes performing behaviometric analysis on the session data (either at an interval or at the end of a session) to build a set of metrics. If textual content is detected/selected at step 415, the system may perform natural language processing ("NLP") at step 417 to further build the set of metrics. For example, in some embodiments, an administrator may select to apply behaviometric or NLP analysis or both. The selection may, for example, be based on which session data is captured (which may also be subject to selection), detection of text and/or keystrokes, and/or whether the survey questions are open-ended or closed-ended. In some embodiments, the system may perform the selection automatically.

For example, in an illustrative embodiment, the set of metrics may be calculated via a script that may be called, automatically, when a survey is completed. The script may, in some embodiments, be embedded in the code running the survey. The script may be generated and/or adjusted based on input of an administrator, e.g., a researcher, via a UI. The researcher may be presented, e.g., prior to the session, with various options for customizing the script configuration. Real-time metrics may also be calculated at fixed intervals throughout the survey (i.e., the script may automatically run at fixed intervals against the data collected up until that point). Relative metrics may also be computed relative to a distribution of metrics at that same time point for other workers in that survey.

At step 419 of flowchart 400, the system may derive characteristic scores based on the set of metrics. Deriving the characteristic scores based on the set of metrics may include feeding the set of metrics to a set of ML classifiers (alternatively referred to as ensembles).

At step 421 of flowchart 400, if the session is not over, system may proceed to check the characteristic scores at step 423. If a score is found above a predetermined threshold, the system may execute a predetermined reaction at step 425. Exemplary reactions may include sending an alert (e.g., alert 501 shown in screenshot 500 of FIG. 5 below) or aborting the session. If the reaction includes an abort, the process may effectively end at step 425. If the reaction includes an alert, or if no score is found above a predetermined threshold at step 423, the system may loop back to step 401 to continue assessing and maintain quality of participant input of the session.

If the session is over at step 421, the system may generate a set of classifications at step 427. At step 429, the system may present the set of classifications to an administrator (e.g., the descriptions shown in screenshot 600 of FIG. 6 below). The administrator may use the set of classifications to reject the participant input and/or the participant.

Figure 5:
FIG. 5 shows an illustrative screenshot in accordance with principles of the disclosure.

FIG. 5 shows screenshot 500 according to principles of the disclosure. Screenshot 500 may show a page of a survey in a session, including a plurality of questions/queries with multiple answer choices. The page may be displayed on a screen of a computing device of a participant. Screenshot 500 includes alert 501, which may be a message transmitted to the participant to maintain a quality of the session. The alert may be triggered by a characteristic score derived from session data at an interval, or by a predetermined event detected in a data stream of the session data. The message of alert 501 may instruct the participant to "Please stay on task and avoid looking at other webpages as you complete this survey." According to some embodiments, the message may include statements designed to get the participant's attention (e.g., "Hey!"), or any other suitable message for alerting the participant.

Figure 6:
FIG. 6 shows another illustrative screenshot in accordance with principles of the disclosure.

FIG. 6 shows screenshot 600 according to principles of the disclosure. Screenshot 600 may show an exemplary set of classifications generated based on session data. According to an embodiment, the set of classifications includes intelligence delivered to an administrator in a dashboard. The intelligence may enable the administrator to make informed decisions, e.g., which data or participant to include in their datasets. In some embodiments, the set of classifications may also include selectable options for rejecting a participant and/or participant input.

According to the embodiment shown in screenshot 600, descriptions of the participant's input quality are returned as part of the set of classifications. These descriptions may include descriptions such as, but not limited to, "Respondent remained on task and completed survey in good time", "Significant idle time while survey was open", "Respondent visited other webpages while survey was open", "Respondent did not read questions carefully before responding", "Respondent displayed inconsistencies throughout the survey", "Respondent copied/pasted responses", "Respondent completed survey far more quickly than average", and/or any other suitable descriptions, while maintaining the spirit of the present invention. In some embodiments, the system may display one or more descriptions according to a predetermined mapping between a set of descriptions and characteristic scores.

Screenshot 600 shows that, in some embodiments of the disclosed system, the system may present an administrator with a dashboard that includes classifications of multiple participants. For example, the dashboard may include classifications of some or all of the participants of a particular survey. The dashboard may include identification numbers and status indicators. In other embodiments, the dashboard may present information of a particular participant across multiple surveys. In still other embodiments, the dashboard may present information related to input classifications across multiple participants and/or multiple surveys in any suitable form for displaying information, e.g., tables, charts, graphs, and the like.

Figure 7:
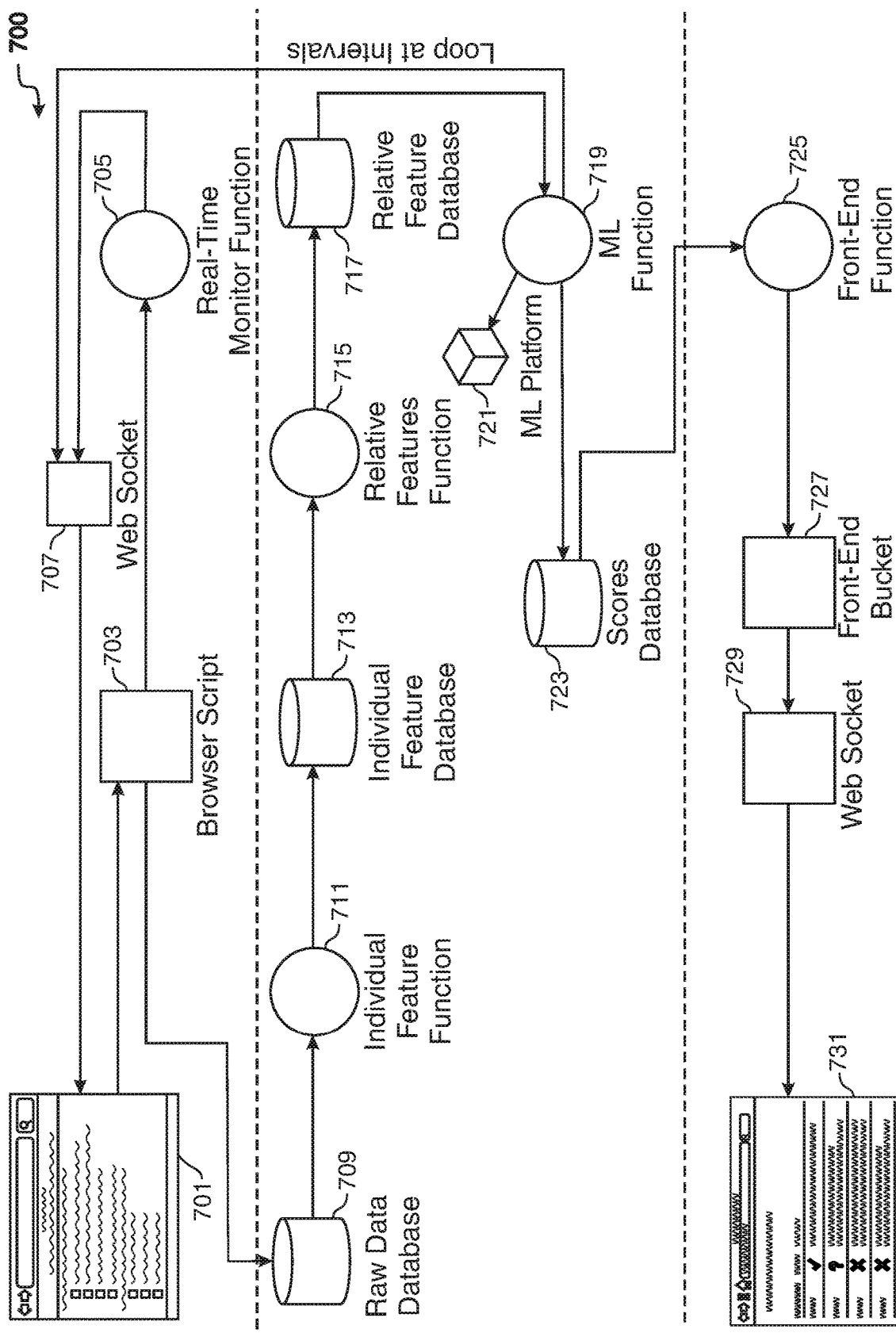
FIG. 7 shows an illustrative diagram in accordance with principles of the disclosure.

FIG. 7 shows diagram 700 according to principles of the disclosure. Diagram 700 shows elements of a system architecture of an exemplary implementation of a system for assessing and maintaining a quality of participant input. The elements shown in diagram 700 are for illustrative purposes only and not to limit the scope of the disclosure. Diagram 700 merely presents one way of implementing aspects of systems and methods of the disclosure.

Diagram 700 includes computing device 701, which may, in one example, display a survey to a participant. The display may be similar to screenshot 500 of FIG. 5 above. Browser script 703, or any other suitable function, may capture activity and/or events and stream them (e.g., via Amazon Web Services ("AWS") Kinesis). A real-time monitoring function 705 (e.g., a Lambda), may process the data in real-time to monitor for "red flags." If a red flag is detected, an alert (e.g., alert 501 shown in screenshot 500 of FIG. 5 above) may be sent to computing device 701 via web socket 707.

The data stream generated by script 703 (e.g., as a JavaScript Object Notation ("JSON")) may be written to a raw data database 709 (e.g., a table called "RAW_JSON" in a database, which may be any suitable database, e.g., a NoSQL or SQL database such as "DynamoDB" or Aurora/MySQL). An individual feature function 711 (e.g., a Lambda) may pull the data stream from raw data database 709, and produce a set of metrics (alternatively referred to as a "feature set"). The set of metrics may be written to an individual features database 713 (e.g. an "INDIVIDUAL_FEATURES" table of a suitable database). Each time a set of metrics is written to individual features database 713, a relative features function 715 (e.g., a Lambda) may be triggered. Relative features function 715 may calculate relative metrics based on data stored in a relative features database 717 (e.g., a "RELATIVE_FEATURES" table of a suitable database). Relative features function 715 may then update relative features database 717 to reflect the newly calculated relative metrics.

An update to relative features database 717 may trigger a machine-learning ("ML") function 719 (e.g., a Lambda). ML function 719 may pass data to a set of ML ensembles 721 (e.g., Amazon "SageMaker" ML platform), and store the received scores in a scores database 723 (e.g., a "SCORES" table of a suitable database).

In certain preferred embodiments, at this point, or any other suitable point in the system architecture, the process may loop back to web socket 707. The process may loop back if the survey is still in progress. The loop may occur at fixed, repeating, substantially continuous, and/or any other suitable intervals during the survey. The loops at the intervals may perform steps of the disclosed methods, including capturing session data, building a set of metrics based, and/or deriving a set of characteristic scores, for each of the intervals. The process may, in some embodiments, proceed out of the loop (e.g., to front-end function 725) when the survey concludes.

An update to scores database 723, or, in some embodiments, conclusion of the survey, may trigger a front-end function 725 (e.g., a Lambda). Front-end function 725 may aggregate data, metrics, and/or scores for one or more participants, and generate classifications. In some embodiments, the classifications may be generated at the end of a session. In other embodiments, the classifications may also be generated at intervals throughout the session.

Generating the classifications may include using a mapping of data, metrics, and/or scores to a set messages. The set of messages may be displayed to an administrator (e.g., a researcher) on a UI at the front-end. Front-end 727 may include a storage element that contains participant classifications and/or other participant and survey information. A web socket 729 may communicate updates to the bucket to the UI 731 associated with the administrator. Communicating the updates may configure UI 731 to display participant information and classifications, e.g., in a dashboard similar to screenshot 600 of FIG. 6 above.

Systems and methods in accordance with aspects of the disclosure may, in some embodiments, utilize computer executable code that may include snippets such as the exemplary code snippets shown in Tables 2-18 below. The code contains comments for illustrative and explanatory purposes. The exemplary snippets may include specific logic, steps, data structures, programming languages, libraries, tools, etc. for implementing certain embodiments. The specific implementations are not meant to limit the scope of the disclosure, but rather to illustrate exemplary embodiments. Any other suitable tools, libraries, algorithms, logic, steps, elements, etc., may be used to implement the methods and systems disclosed herein.

Table 2 shows an exemplary code snippet for a function that implements certain features of an embodiment according to aspects of the disclosure. The snippet includes a JavaScript function that captures browser events.

TABLE 2

```
setupDocumentEventHandlers(uiEvents: Array<UiEvent>): void {
    uiEvents.forEach(eventName => {
        document[eventName] = eventSrc => {
            this.processAndSendEvent(eventSrc,
            EventTypeToDataMap[eventName]);
        };
    });
}
```

Table 3 shows an exemplary code snippet for a function that implements certain features of an embodiment according to aspects of the disclosure. The snippet includes a JavaScript function that streams browser events (e.g., via websockets) to the backend (e.g., Asp.Net).

TABLE 3

```
send(data: any): void {
    const info = {data, sessionId: this.participantId,
        pageId: this.pageId, eventTime:
getUtcTime( ), id: uuidv( ) };
    if (this.connection.state === HubConnectionState.Connected) {
        this.connection
            .invoke('SendEventData', JSON.stringify(info))
            .catch(err => console.error(err.toString( )));
    }
}
```

Table 4 shows an exemplary code snippet for a function that implements certain features of an embodiment according to aspects of the disclosure. The snippet includes C # code to stream data to a cloud (The cloud may be hosting various tools and databases for processing and storing the data).

TABLE 4

```
private async Task PublishData( )
{
    var keys = Context.Items.Keys.Select(key => key.ToString( ))
                .ToList( );
    var records = keys.Select(key =>
    Context.Items[key].ToString( )).ToList( );
    try
    {
        var successfulPublish = await _eventPublisher.Publish(records);
        if (successfulPublish)
        {
            RemoveRecordsFromContext(keys);
        }
    }
    catch (Exception e)
    {
        _logger.LogError(e.ToString( ));
        await Task.CompletedTask;
    }
}
```

Table 5 shows an exemplary code snippet for a function that implements certain features of an embodiment according to aspects of the disclosure. The snippet includes a Python function that may determine if a user is an outlier relative to a certain calculated feature, as compared to other participants for that survey.

TABLE 5

```
def is_outlier(row, col):
    q25, q75 = percentile(col, 25), percentile(col, 75)
    iqr = q75 − q25
    cut_off = iqr * 1.5
    lower, upper = q25 − cut_off, q75 + cut_off
    x = row[col]
    if x < lower or x > upper:
        return True
    else:
        return False
```

Table 6 shows an exemplary code snippet for a function that implements certain features of an embodiment according to aspects of the disclosure. The snippet includes a Python function that may indicate if a given mouse event is within the target range of a survey.

TABLE 6

```
def_is_in_target(event, target):
    x = event['data']['x']
    y = event['data']['y']
    if x >= target['left'] and x <= target['right'] and y >= target['top'] and y <= target['bottom']:
        return True
    else:
        return False
```

Table 7 shows an exemplary code snippet for a function that implements certain features of an embodiment according to aspects of the disclosure. The snippet includes a Python function that may calculate the total amount of time a user spends out of the target range for a given page.

TABLE 7

```
def time_out_target(mouse_positions, target):
    total_time = 0.0
    for i in range(len(mouse_positions)):
        e = mouse_positions[i]
        target = is_in_target(e, target)
        if target == False and i > 0:
            previous = is_in_target(mouse_positions[i −1])
            if previous:
                start = e['data']['timestamp']
                for j in range(i, len(mouse_positions)):
                    evJ = mouse_positions[j]
                    if evJ['type'] == 'mouse-position':
                        targetB = is_in_target(mouse_positions[j], target)
                        if targetB == True or j == len(mouse_positions)−1:
                            end = mouse_positions[j]['data']['timestamp']
                            time = end − start
                            total_time += time
                            break
    return total_time
```

Table 8 shows an exemplary code snippet for a function that implements certain features of an embodiment according to aspects of the disclosure. The snippet includes a Python function that may calculate the occurrences of different event types for a survey.

TABLE 8

```
def event_type_counts(events):
    event_counts = {
        'entrances': 0,
```

TABLE 8-continued

```
        'exits': 0,
        'clicks': 0,
        'copy': 0,
        'paste': 0,
        'loss_of_focus': 0,
        'selection': 0
    }
    for e in events:
        if e['type'] == 'enter':
            event_counts['entrances'] += 1
        elif e['type'] == 'exit':
            event_counts['exits'] += 1
        elif e['type'] == 'click':
            event_counts['clicks'] += 1
        elif e['type'] == 'copy':
            event_counts['copy'] += 1
        elif e['type'] == 'paste':
            event_counts['paste'] += 1
        elif e['type'] == 'loss-of-focus':
            event_counts['loss_of_focus'] += 1
        elif e['type'] == 'selection':
            event_counts['selection'] += 1
    return event_counts
```

Table 9 shows an exemplary code snippet for a function that implements certain features of an embodiment according to aspects of the disclosure. The snippet includes a Python function that may return the amount of time spent on a given page before the first keystroke.

TABLE 9

```
def time_to_first_keystroke(events, keystrokes):
    return keystrokes[0]['data']['timestamp'] − events[0]['data']['timestamp']
```

Table 10 shows an exemplary code snippet for a function that implements certain features of an embodiment according to aspects of the disclosure. The snippet includes a Python function that may calculate the average time between clicks for a survey.

TABLE 10

```
def avg_time_bet_clicks(clicks):
    time = 0
    if len(clicks) > 0:
        for i in range (len(clicks)−1):
            diff = clicks[i+1]['data']['timestamp'] − clicks[i]['data']['timestamp']
            time += diff
        return time / len(clicks)
    else:
        return None
```

Table 11 shows an exemplary code snippet for a function that implements certain features of an embodiment according to aspects of the disclosure. The snippet includes a Python function that may calculate the deviation of a path (e.g., the path of movement of a mouse cursor) from an ideal, direct trajectory.

TABLE 11

```
def deviation_from_ideal(path):
    total_diff = 0
    max = 0
    startX = path[0]['data']['x']
    startY = path[0]['data']['y']
    endX = path[len(path) − 1]['data']['x']
    endY = path[len(path) − 1]['data']['y']
    #Get path of ideal line
    m = slope((startX, startY), (endX, endY))
    b = y_intercept((startX, startY), m)
```

TABLE 11-continued

```
        ideal_path = [ ]
        #Get points of ideal line; match number of points in ideal
    to points in actual
        if startX != endX:
            total_length = abs(startX − endX)
            increment = total_length / len(path)
            idealX = startX
            for i in range(len(path)):
                idealY = m*idealX+b
                ideal_path.append((idealX, idealY))
                idealX += increment
        else: #i.e. a perfectly vertical line
            total_length = abs(startY − endY)
            increment = total_length / len(path)
            idealY = startY
            for i in range(len(path)):
                idealX = startX
                ideal_path.append((idealX, idealY))
                idealY+=increment
        #For each point on the actual line, compute distance to
    corresponding point on ideal line
        for i in range(1, len(path)−1):
            iX = ideal_path[i][0]
            iY = ideal_path[i][1]
            aX = path[i]['data']['x']
            aY = path[i]['data']['y']
            dist = math.hypot(aX − iX, aY − iY)
            total_diff += dist
            if dist > max:
                max = dist
        return total_diff, max
```

Table 12 shows an exemplary code snippet for a function that implements certain features of an embodiment according to aspects of the disclosure. The snippet includes a Python function that may calculate the average deviation from ideal path throughout a survey.

TABLE 12

```
def avg_deviation(paths):
    if len(paths) > 0:
        total_dev = 0
        max_dev = 0
        for p in paths:
            d = deviation_from_ideal_b(p)
            total_dev += d[0]
            max_dev += d[1]
        return total_dev / len(paths), max_dev / len(paths)
    else:
        return None
```

Table 13 shows an exemplary code snippet for a function that implements certain features of an embodiment according to aspects of the disclosure. The snippet includes a Python function that may return basic word count metrics for open ended responses.

TABLE 13

```
def word_count_metrics(answer):
    aTokens = word_tokenize(answer)
    aTokensNoPunct = [x for x in aTokens if not re.fullmatch
('[' + string.punctuation +']+', x)]
    aSentences = sent_tokenize(answer)
    word_count = len(aTokensNoPunct)
    sentence_count = len(aSentences)
    avg_sentence_length = word_count / len(aSentences)
    chars = 0
    for word in aTokensNoPunct:
        chars += len(word)
    avg_word_length = chars / word_count
    punctuation_count = [x for x in aTokens if re.fullmatch
('[' + string.punctuation +']+', x)]
    punctuation_ratio = punctuation_count / word_count
```

TABLE 13-continued

```
    return word_count, avg_word_length, sentence_count,
avg_sentence_length, punctuation_ratio
```

Table 14 shows an exemplary code snippet for a function that implements certain features of an embodiment according to aspects of the disclosure. The snippet includes a Python function that may compute the relevancy between a given question and answer.

TABLE 14

```
def compute_relevancy(a, b):
    count = 0
    stop_words = set(stopwords.words('english'))
    if isinstance(a, str):
        aTokens = word_tokenize(a)
    else:
        aTokens = a
    if isinstance(b, str):
        qTokens = word_tokenize(b)
    else:
        qTokens = b
    question = {word for word in qTokens if word in model.vocab
and word.lower( ) not in stop_words}
    answer = {word for word in aTokens if word in model.vocab
and word.lower( ) not in stop_words}
    for word in answer:
        if word in question: # direct overlap
            count += 1
        else: # see if one of the most similar words
            for s in question:
                if model.similarity(word, s) >= .3:
                    count += 1
                    break
    return count
```

Table 15 shows an exemplary code snippet for a function that implements certain features of an embodiment according to aspects of the disclosure. The snippet includes a Python function that may calculate parts of speech counts and ratios for an open-ended response.

TABLE 15

```
def parts_of_speech(answer):
    num_nouns = 0
    num_tokens = 0
    num_verbs = 0
    aSentences = sent_tokenize(answer)
    for sentence in aSentences:
        aTokens = word_tokenize(sentence)
        tokens = nltk.pos_tag(aTokens)
        num_nouns += len([for word, tag in tokens if tag.startswith
('NN')])
        num_verbs += len([for word, tag in tokens if tag.startswith
('VB')])
        num_tokens += len(tokens)
    noun_ratio = num_nouns / num_tokens
    verb_ratio = num_verbs / num_tokens
    return noun_ratio, verb_ratio
```

Table 16 shows an exemplary code snippet for a function that implements certain features of an embodiment according to aspects of the disclosure. The snippet includes a Python function that may calculate the lexical level for an open-ended response.

TABLE 16

```
def lexical_level(answer):
    calc = ReadCalc(answer)
    return calc.get_flesch_kincaid_grade_level( )
```

Table 17 shows an exemplary code snippet for a function that implements certain features of an embodiment according to aspects of the disclosure. The snippet includes a Python function that may compute the relevancy of an open-ended response to the common corpus of all responses to that question

TABLE 17

```
def common_corpus_overlap(common, answer):
    aTokens = word_tokenize(answer)
    aTokensNoPunct = [x for x in aTokens if not re.fullmatch
('[' + string.punctuation +']+', x)]
    commonTokens = word_tokenize(common)
    commonTokensNoPunct = [x for x in commonTokens if not
re.fullmatch ('[' + string.punctuation +']+', x)]
    for t in aTokensNoPunct:
        commonTokensNoPunct.remove(t)
    return compute_relevancy(aTokensNoPunct,
commonTokensNoPunct)
```

Table 18 shows exemplary code for a module that implements certain features of an embodiment according to aspects of the disclosure. The module includes code for generating a visual representation of the session data.

TABLE 18

```
import numpy as np
import pandas as pd
import sys
from matplotlib import cm
import math
import cv2
import json
from sklearn import preprocessing
import os
# Globals
HUMAN = False
file_name = ''
WIDTH = 0
HEIGHT = 0
RED = (0, 0, 255)
WHITE = (255, 255, 255)
CLICK_COLOR = (255, 0, 0)
ENTRANCE_COLOR = (0, 255, 0)
matrix = [ ]
entrances = [ ]
clicks = [ ]
img = [ ]
session = [ ]
pages = [ ]
df = [ ]
font = cv2.FONT_HERSHEY_SIMPLEX

Get the session of the json
# def get_session_lambda(event):
#    global file_name, session
#    bucket_name = event['Records'][0]['s3']['bucket']['name']
#    file_key = event['Records'][0]['s3']['object']['key']
#    file_name = file_key
#    obj = s3.get_object(Bucket=bucket_name, Key=file_key)
#    file = open(obj, encoding='utf-8')
#    session = json.load(file)
file.close( )
def get_session_local(filepath):
    global file_name, session
    input_file = filepath
    file_name = input_file.replace('.', '_out.')
    file = open(input_file, encoding='utf-8')
    session = json.load(file)
    file.close( )
# Get the pages
def get_pages( ):
    global pages
    pages = session['pages']
# Set image dimensions, given a session
def set_img_dimensions( ):
```

TABLE 18-continued

```
    global WIDTH, HEIGHT
    WIDTH = session['resolution']['x']
    HEIGHT = session['resolution']['y']
    print('Height')
    print(HEIGHT)
# Create a blank (black) image
def create_img( ):
    print('calling create_img')
    global img
    img = np.zeros((HEIGHT, WIDTH, 3), np.uint8)
# Draw the divs on an image, given an img and a page
def draw_page_divs(page):
    divs = page['info']
    print('What is divs')
    print(divs)
    for d in divs:
        element = d['element']
        cv2.rectangle(img, (int(element['left']), int(element['top'])),
(int(element['right']), int(element['bottom'])),
            RED, 3)
        if 'title' in d:
            element = d['title']
            cv2.rectangle(img, (int(element['left']), int(element['top'])),
                (int(element['right']), int(element['bottom'])),
                RED, 3)
        if 'body' in d:
            element = d['body']
            cv2.rectangle(img, (int(element['left']), int(element['top'])),
                (int(element['right']), int(element['bottom'])),
                RED, 3)
def draw_div_labels(page):
    divs = page ['info']
    for d in divs:
        element = d['element']
        cv2.putText(img, d['type'], (int(element['left']),
int(element['top']) + 10), font, 0.5, WHITE, 1, cv2.LINE_AA)
        if 'title' in d:
            element = d['title']
            cv2.putText(img, 'title', (int(element['left']),
int(element['top']) + 10), font, 0.5, WHITE, 1,
                cv2.LINE_AA)
        if 'body' in d:
            element = d['body']
            cv2.putText(img, 'body', (int(element['left']),
int(element['top']) + 10), font, 0.5, WHITE, 1, cv2.LINE_AA)
#Draw the mouse movements on an image, given an img and
a page def create_matrix(page):
    global matrix, entrances, clicks
    matrix, entrances, clicks = [[ ] for i in range(3)]
    events = page['events']
    prev_x, prev_y, prev_timestamp = [None] * 3
    for e in events:
        if e['type'] == 'mouse-position':
            data = e['data']
            timestamp, x, y = data['timestamp'], data['x'], data['y']
            x, y = int(x), int(y)
            matrix.append([prev_timestamp, prev_x, prev_y,
timestamp, x, y])
            if prev_timestamp is None:
                entrances.append((x, y))
            prev_timestamp, prev_x, prev_y = timestamp, x, y
        # In the event of loss of focus, exit, or enter, we set previous
datapoints to none so that the line _should_ be disjoint
        elif e['type'] == 'loss-of-focus' or e['type'] == 'loss-of-foucs' or
            e['type'] == 'exit' or e['type'] == 'enter':
            prev_x, prev_y, prev_timestamp = [None] * 3
        # elif
        elif e['type'] == 'mouse-up':
            element = edata
            x, y = int(element['x']), int(element['y'])
            clicks.append((x, y))
        else:
            print(e)
# Process the dataframe
def process_dataframe( ):
    global df
    print('calling process dataframe')
    df = pd.DataFrame(matrix, columns=['timestampA', 'xa', 'ya',
'timestampB', 'xb', 'yb'])
    df = df. dropna( )
```

TABLE 18-continued

```
    df['distance'] = df.apply(lambda row: distance(row), axis=1)
    df['speed'] = df.apply(lambda row: speed(row), axis=1)
    x = df[['speed']].values.astype(float)
    min_max_scaler = preprocessing.MinMaxScaler( )
    x_scaled = min_max_scaler.fit_transform(x)
    df['normal_speed'] = x_scaled
    df['color'] = df.apply(lambda row: color(row), axis=1)
    print(df)
# Draw the mouse movements on an image, given an img and a page
def draw_mouse_movements():
    for i in range(len(df['color'])):
        startPoint = (int(df.iloc[i, df.columns.get_loc('xa')]), int(df.iloc[i, df.columns.get_loc('ya')]))
        endPoint = (int(df.iloc[i, df.columns.get_loc('xb')]), int(df.iloc[i, df.columns.get_loc('yb')]))
        color = df.iloc[i, df.columns.get_loc('color')]
        color2 = tuple(100 * x for x in color)
        cv2.line(img, startPoint, endPoint, color2, 3)
# Draw the mouse clicks on an image, given a page
def draw_mouse_clicks():
    for i, (x, y) in enumerate(clicks):
        cv2.circle(img, (x, y), 5, CLICK_COLOR, -1)
        if HUMAN:
            cv2.putText(img, str(i), (x, y + 10), font, 0.5, CLICK_COLOR, 1, cv2.LINE_AA)
def draw_entrances():
    for i, (x, y) in enumerate(entrances):
        cv2.circle(img, (x, y), 5, ENTRANCE_COLOR, -1)
        if HUMAN:
            cv2.putText(img, str(i), (x, y + 10), font, 0.5, ENTRANCE_COLOR, 1, cv2.LINE_AA)
# Save the image to s3
def save_image(page_index):
    name = file_name + str(page_index) + '.png'
    cv2.imshow('image', img)
    cv2.waitKey(0)
    cv2.imwrite(name, img)
# Draw a full image, given a page
def draw_page(i, page):
    global img
    create_img( ) # Get a blank image
    create_matrix(page) # Organize the data into matrix
    print(matrix)
    if matrix != [ ]:
        process_dataframe( ) # Process the matrix into a dataframe
        draw_page_divs(page) # Draw the divs
        if HUMAN:
            draw_div_labels(page)
        draw_mouse_movements()
        draw_mouse_clicks()
        draw_entrances()
        save_image(i)
# Helper functions
def distance(row):
    sq1 = (row['xb'] − row['xa']) * (row['xb'] − row['xa'])
    sq2 = (row['yb'] − row['ya']) * (row['yb'] − row['ya'])
    return math.sqrt(sq1 + sq2)
def speed(row):
    time = row['timestampB'] − row['timestampA']
    if time == 0:
        return row['distance']
    else:
        return row['distance'] / time
def color(row):
    speed = row['normal_speed']
    cmap = cm.get_cmap('Greens')
    rgba = cmap(speed)
    return rgba
# # Entry point
# def entry_point(event):
#     get_session_lambda(event)
#     get_pages( )
set_img_dimensions( )
#     for i in range(len(pages)):
#         page = pages[i]
#         draw_page(page)
def main( ):
    # Get all the files...
    jsons = [ ]
    for subdir, dirs, files in os.walk('./sdp_jsons'):
        for file in files:
            filepath = subdir + os.sep + file
            if filepath.endswith(".json"):
                jsons.append(filepath)
    print(jsons)
    for filepath in jsons:
        get_session_local(filepath)
        get_pages( )
        set_img_dimensions( )
        draw_page(1, pages[1])
HUMAN = True
main( )
```

The steps of methods of the disclosure may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, ML-based methods and systems for quality detection of digital input are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for assessing one or more characteristics of digital participant input, said participant input that is generated by a participant in response to a survey during a session on a computing device, the method executed by computer code stored in non-transitory memory and running on a processor, the method comprising:

capturing session data via the computing device, said session data comprising participant activity data;

building a set of metrics based on the session data;

deriving a set of characteristic scores by feeding the set of metrics to one or more machine learning ("ML") ensembles;

generating a set of classifications based on the set of characteristic scores; and displaying the set of classifications on a user interface ("UI") that is associated with a session administrator;

wherein the set of classifications comprises a flag for rejecting the session and/or the participant when the set of characteristic scores includes a score that is outside a predetermined threshold; and wherein, when the participant input is in response to one or more questions presented on one or more pages displayed on the computing device during the session, the session data further comprises page data of each page, and capturing the session data comprises:

scraping a layout of each page to obtain the page data; and logging cursor movements and/or keystrokes on the computing device to obtain the participant activity data.

2. The method of claim 1, wherein the deriving the set of characteristic scores includes a multi-tiered ML classification process, the multi-tiered ML classification process comprising:

feeding the set of metrics to a first set of ML ensembles to derive a first set of characteristic scores; and feeding the first set of characteristic scores to a second set of ML ensembles to derive a second set of characteristic scores;

wherein the multi-tiered ML classification process is extendable to include a predetermined number of successive sets of ML ensembles for deriving a final set of characteristic scores from the set of metrics.

3. The method of claim 1, further comprising receiving a selection from the session administrator, via the UI, for determining which session data to capture.

4. The method of claim 1, wherein the flag comprises presenting the session administrator, via the UI, with one or more selectable options including:

automatically adjusting a weighting of the participant input based at least in part on the set of characteristic scores;

excluding the participant input from a dataset generated by the survey; and rejecting the participant from future surveys.

5. The method of claim 1, wherein the set of metrics comprises absolute metrics and relative metrics, and building the set of metrics comprises:

generating the absolute metrics based on the session data; and generating the relative metrics by comparing the absolute metrics of the participant to absolute metrics of other participants.

6. The method of claim 1, further comprising:

streaming the session data as a data stream to a database;

monitoring the data stream in real-time for one or more predetermined events; and when a predetermined event from the one or more predetermined events is detected, triggering a predetermined reaction.

7. The method of claim 6, wherein said one or more predetermined events includes pasting content from outside the session, an idle time that is more than a predetermined amount of time, a loss of focus event, and/or exiting a webpage window of the survey; and said predetermined reaction comprises flagging the session, aborting the session, and/or transmitting an alert to the participant via the computing device and/or to the administrator via the UI.

8. The method of claim 1, wherein the building the set of metrics and the deriving the set of characteristic scores are executed after completing the session and also at predetermined time intervals during the session.

9. The method of claim 8, further comprising transmitting, when a characteristic score derived at an interval is outside a predetermined threshold, an alert to the participant via the computing device and/or to the administrator via the UI.

10. The method of claim 9, wherein said transmitting an alert to the participant comprises displaying a message on a display of the computing device, said message comprising a warning to the participant to be more attentive and/or more accurate in responding to the survey.

11. The method of claim 8, further comprising flagging the session and/or aborting the session when a characteristic score derived at an interval is outside a predetermined threshold.

12. The method of claim 1, wherein the building the set of metrics includes performing behaviometric analysis and/or natural language processing ("NLP") analysis on the session data.

13. The method of claim 1, wherein building the set of metrics comprises:

calculating spatial metrics based on trajectories of the cursor movements and on the page data, said spatial metrics comprising an absolute deviation from an ideal trajectory of the cursor movement and a maximum deviation from the ideal trajectory of the cursor movement;

calculating temporal metrics based on time measurements of participant interaction with a page; and when an option to exclude keystroke metrics has not been selected, calculating keystroke metrics based on flight time, dwell time, and/or pause time of the keystrokes.

14. The method of claim 1, wherein, when the participant input is an open-ended input, capturing the session data comprises capturing session content on the computing device, and building the set of metrics comprises performing natural language processing ("NLP") on the session data.

15. The method of claim 14, wherein building the set of metrics comprises:

calculating, via a word similarity tool, a relevance of the participant input to a question to which the participant input is responsive, said relevance comprising:

coverage, said coverage being a ratio of words in the question that have a similar word in the participant input; and overlap, said overlap being a ratio of words in the participant input that have a similar ward in the question; and calculating the relevance of the participant input to a common corpus, said common corpus that is built from inputs of other participants to the question; and calculating, via an NLP function, one or more lexical qualities of the participant input.

16. The method of claim 14, further comprising:

collecting historical data of questions and the participant's answers to said questions;

using NLP to characterize the questions and the answers; and when the participant provides a new answer to a new question:

computing a probability of the accuracy of the new answer; and when the probability is outside a threshold probability, flagging the participant a inconsistent.

17. The method of claim 1, wherein the set of characteristic scores comprises data quality scores and/or participant demographic scores.

18. The method of claim 17, wherein the data quality scores comprise an attentiveness score, an accuracy score, a validity score, a consistency score, and/or a reading score.

19. The method of claim 17, wherein the participant demographic scores comprise an age-bracket score, a gender score, and/or a nationality score.

20. The method of claim 1, further comprising generating a visual representation of at least a part of the session data, and using image classification to generate at least a part of the set of characteristic scores from the visual representation.

21. A method for assessing one or more characteristics of digital participant input, said participant input that is generated by a participant in response to a survey during a session on a computing device, the method executed by computer code stored in non-transitory memory and running on a processor, the method comprising:

capturing session data via the computing device, said session data comprising participant activity data;

building a set of metrics based on the session data;

deriving a set of characteristic scores by feeding the set of metrics to one or more machine learning ("ML") ensembles;

generating a set of classifications based on the set of characteristic score; and displaying the set of classifications on a user interface ("UI") that is associated with a session administrator;

wherein:

the set of classifications comprises a flag for rejecting the session and/or the participant when the set of characteristic scores includes a score that is outside a predetermined threshold;

when the participant input is an open-ended input, capturing the session data comprises capturing session content on the computing device, and building the set of metrics comprises performing natural language processing ("NLP") on the session data; and building the set of metrics comprises:

calculating, via a word similarity tool, a relevance of the participant input to a question to which the participant input is responsive, said relevance comprising:

coverage, said coverage being a ratio of words in the question that have a similar word in the participant input; and overlap, said overlap being a ratio of words in the participant input that have a similar word in the question; and calculating the relevance of the participant input to a common corpus, said common corpus that is built from inputs of other participants to the question; and calculating, via an NLP function, one or more lexical qualities of the participant input.

22. A method for assessing one or more characteristics of digital participant input, said participant input that is generated by a participant in response to a survey during a session on a computing device, the method executed by computer code stored in non-transitory memory and running on a processor, the method comprising:

capturing session data via the computing device, said session data comprising participant activity data;

building a set of metrics based on the session data;

deriving a set of characteristic scores by feeding the set of metrics to one or more machine learning ("ML") ensembles;

generating a set of classifications based on the set of characteristic scores; and displaying the set of classifications on a user interface ("UI") that is associated with a session administrator;

wherein:

the set of classifications comprises a flag for rejecting the session and/or the participant when the set of characteristic scores includes a score that is outside a predetermined threshold;

when the participant input is in response to one or more questions presented on one or more pages displayed on the computing device during the session, the session data further comprises page data of each page, and capturing the session data comprises:

scraping a layout of each page to obtain the page data; and logging cursor movements and/or keystrokes on the computing device to obtain the participant activity data; and building the set of metrics comprises:

calculating spatial metrics based on trajectories of the cursor movements and on the page data, said spatial metrics comprising an absolute deviation from an ideal trajectory of the cursor movement and a maximum deviation from the ideal trajectory of the cursor movement;

calculating temporal metrics based on time measurements of participant interaction with a page; and when an option to exclude keystroke metrics has not been selected, calculating keystroke metrics based on flight time, dwell time, and/or pause time of the keystrokes.

\* \* \* \* \*

UNITED STATES PATENT AND TRADEMARK OFFICE
CERTIFICATE OF CORRECTION

| | |
|---|---|
| PATENT NO. | : 10,572,778 B1 |
| APPLICATION NO. | : 16/354437 |
| DATED | : February 25, 2020 |
| INVENTOR(S) | : Jonathan Robinson et al. |

Page 1 of 1

It is certified that error appears in the above-identified patent and that said Letters Patent is hereby corrected as shown below:

On the Title Page

Item [57], Line 8, delete "("UP")" and insert --("UI")--.

In the Specification

Column 3, Line 11, delete "("UP")" and insert --("UI")--.

Column 8, Line 52, delete "("UP")" and insert --("UI")--.

In the Claims

Claim 15, Line 54, delete "ward" and insert --word--.

Claim 16, Line 4, delete "a inconsistent" and insert --as inconsistent--.

Claim 21, Line 33, delete "set of characteristic score" and insert --set of characteristic scores--.

Signed and Sealed this
Twelfth Day of May, 2020

Andrei Iancu
*Director of the United States Patent and Trademark Office*